(12) United States Patent
Hsu et al.

(10) Patent No.: US 7,514,833 B2
(45) Date of Patent: Apr. 7, 2009

(54) AXIAL GAP PERMANENT-MAGNET MACHINE WITH RELUCTANCE POLES AND PM ELEMENT COVERS

(75) Inventors: John S. Hsu, Oak Ridge, TN (US); John W. McKeever, Oak Ridge, TN (US)

(73) Assignee: UT-Battelle LLC, Oak Ridge, TN (US)

(*) Notice: Subject to any disclaimer, the term of this patent is extended or adjusted under 35 U.S.C. 154(b) by 497 days.

(21) Appl. No.: 11/228,698

(22) Filed: Sep. 16, 2005

(65) Prior Publication Data

US 2006/0131986 A1 Jun. 22, 2006

Related U.S. Application Data

(63) Continuation-in-part of application No. 11/018,751, filed on Dec. 21, 2004, now abandoned.

(60) Provisional application No. 60/607,338, filed on Sep. 3, 2004.

(51) Int. Cl.
*H02K 21/24* (2006.01)
*H02K 23/54* (2006.01)

(52) U.S. Cl. .................. 310/156.34; 310/156.36; 310/268

(58) Field of Classification Search .................. 310/156.32–156.37, 162, 168, 268
See application file for complete search history.

(56) References Cited

U.S. PATENT DOCUMENTS 3,401,287 A * 9/1968 French et al. ............... 310/168
3,991,333 A * 11/1976 Laskaris ..................... 310/52
5,021,698 A * 6/1991 Pullen et al. ............ 310/156.29
5,642,009 A * 6/1997 McCleer et al. ........ 310/156.35
6,232,696 B1 * 5/2001 Kim et al. .............. 310/156.37
6,445,105 B1 * 9/2002 Kliman et al. .............. 310/268
2004/0135453 A1 * 7/2004 Naito et al. ............ 310/156.32

* cited by examiner

*Primary Examiner*—Quyen Leung
*Assistant Examiner*—David W. Scheuermann
(74) *Attorney, Agent, or Firm*—Boyle Fredrickson, S.C.

(57) ABSTRACT

An electric machine (10) has a disk-shaped rotor (24) disposed in an operating space between two opposing stator assemblies (11, 12) to provide two axial air gaps (15, 16). The rotor (24) has a hub (28) and an outer ring (26) of non-magnetic material and is further provided with a plurality of permanent magnetic elements (25) for coupling flux that is induced by the magnetic field of the stator assemblies (11, 12). The permanent magnetic elements (25) are spaced apart and reluctance poles (27) are positioned in spaces between the magnetic elements (25) to couple additional flux induced by the magnetic field of the stator assemblies (11, 12). Various constructions and shapes (40-45) for the PM magnetic elements (25) are disclosed, and including PM covers (60) of ferromagnetic material for enhancing q-axis flux in the air gaps (15, 16) and for reducing harmonics where toothed stators are used. Methods of providing increased torque using the the various rotor constructions are also disclosed.

18 Claims, 5 Drawing Sheets

AXIAL GAP PERMANENT-MAGNET MACHINE WITH RELUCTANCE POLES AND PM ELEMENT COVERS

CROSS-REFERENCE TO RELATED APPLICATION

This is a continuation-in-part of U.S. patent application Ser. No. 11/018,751, filed Dec. 21, 2004, and now abandoned. The benefit of U.S. Prov. Appl. No. 60/607,338 filed Sep. 3, 2004 is also claimed herein.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both ac and dc machines, including both motors and generators, and including induction machines, permanent magnet (PM) machines and switched reluctance machines.

DESCRIPTION OF THE BACKGROUND ART

There are various radial-gap PM-reluctance motors available in the market. However, there is no axial-gap PM reluctance motor seen in the market. The rotor structure of an axial-gap motor is a thin disk, which is very different from the rotor of the radial-gap motor.

It is commonly known that a permanent magnet (PM) electric machine has the properties of high efficiency and high power density. By introducing a reluctance path to a PM motor the total torque that includes the PM synchronous torque and the reluctance torque can be increased.

U.S. Pat. No. 4,996,457 issued Feb. 26, 1991, disclosed a high speed permanent magnet (PM) axial gap machine with multiple stators. This machine employed one rotor sandwiched between two stators. This early machine consisted of two supporting non-magnetic annuli, each having an even number of embedded equi-angularly spaced cylindrical magnets held in place against opposite sides of a ferromagnetic flux return plate. In U.S. Pat. No. 5,117,141 issued on May 26, 1992 equi-angularly spaced cylindrical magnets were embedded in a single non-magnetic disk to enable a single rotor to be used by two stators and to allow flux to pass through both stators and the rotor. This allowed more efficient use of magnetic material, which is the most expensive component of a PM motor.

Permanent magnet motors produce a back-emf and torque that depend upon the amount of magnetic material; however, after the back-emf reaches the level of the supply voltage it becomes difficult to drive the motor.

It is desired to make such an axial gap PM machine that will provide increased torque for the same amount of applied energy.

Naito et al., U.S. Pat. Pub. 2004/0135453, discloses an axial gap PM machine with an iron rotor having reluctance poles. This machine is intended for use as a starter motor and generator in a motor vehicle. This machine has a stator on only one side as it is primarily for starting and providing power for accessories in a vehicle. Such a machine is not deemed suitable for application as a traction drive motor in an electric or hybrid vehicle.

It would be desirable to provide a PM and reluctance pole machine that operates not only for startup and a low-level power supply, but also as a machine that is suitable for operating through the full speed range of a vehicle. Such a machine would have a higher power rating and other characteristics which are different from the prior art vehicle generators.

The single-sided stator in the prior art machine provides a magnetic pull on only one side. This does not provide sufficient axial balance under loading conditions encountered by a vehicle traction motor. The single stator design would result in a heavy axial load under such circumstances.

The prior art starter motor/generator with reluctance poles has a high rotor inertia due to the heavy rotor iron disc which is used for a flux return yoke path.

SUMMARY OF THE INVENTION

This invention teaches a method for improving a conventional axial-gap PM machine to become a high strength, high power PM reluctance machine.

The prior art PM machine is characterized by a rotor disk having a plurality of PM wedges disposed radially on the disk. This invention proposes to reduce the angle and width of the PM pole elements and alternate them with smaller ferromagnetic reluctance pole elements. The reluctance torque provided through the reluctance poles adds more torque than the PM elements. Less PM material will allow the motor to reach higher speeds.

The invention is incorporated in a brushless electric machine, comprising at least one stator assembly for receiving ac electrical power to provide a magnetic field, a rotor disposed within the magnetic field of the stator assembly and spaced from the stator to define a primary air gap relative to an axis of rotation for the rotor. The rotor is disk-shaped and is spaced from the stator assembly along an axis of rotation for the rotor to form a first axial air gap. The rotor is provided with a plurality of permanent magnetic elements for coupling flux that is induced by the magnetic field of the stator assembly. The permanent magnetic elements are spaced apart and reluctance poles are positioned in spaces between the magnetic elements to couple additional flux induced by the magnetic field of the stator assembly.

A further aspect of the invention is that with stator assemblies on both sides of the rotor, axial loading on the rotor is reduced. In a further aspect, by providing a rotor hub and outer ring of non-magnetic material, a flux return path for flux through the reluctance poles does not pass through supporting parts of the rotor, and the reduction in iron reduces rotor inertia. In still a further aspect, PM covers or outer layers are provided for the PM elements to enhance q-axis (torque-producing) flux through the reluctance poles and to shield the PM elements from harmonics caused by the stator assemblies having a toothed configuration.

The invention is also practiced in a method of increasing available torque in a brushless electrical PM machine, the method comprising providing a rotor with PM poles spaced apart and with reluctance poles situated in the spaces between the PM poles, inducing a flux in a rotor disposed between two stator assemblies, the flux being conducted through two air gaps spaced along an axis of rotation of the rotor, and positioning the rotor with the reluctance poles offset from the stator teeth such that the flux is twisted as it is conducted from one tooth on one of the stator assemblies through one of the reluctance poles in the rotor and into another one of the two stator assemblies.

The invention also provides various advantageous configurations for the rotor, the PM poles and the reluctance poles.

The invention is also applicable to both ac and dc machines and to both motors and generators.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1:
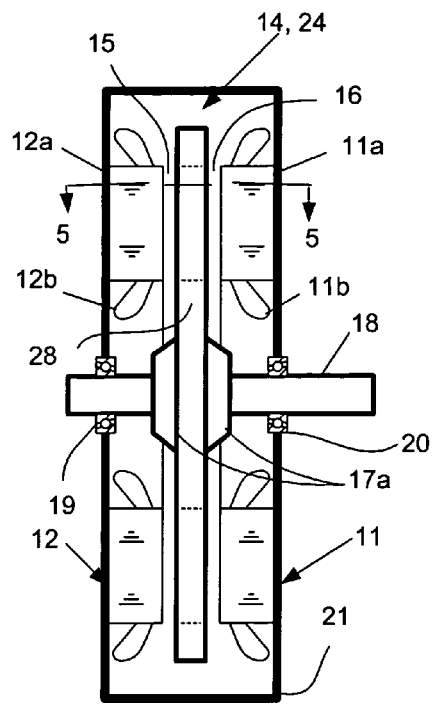
FIG. 1 is a sectional view of a basic configuration of an axial gap PM machine applicable to both the prior art and to the present invention.
Figure 2:
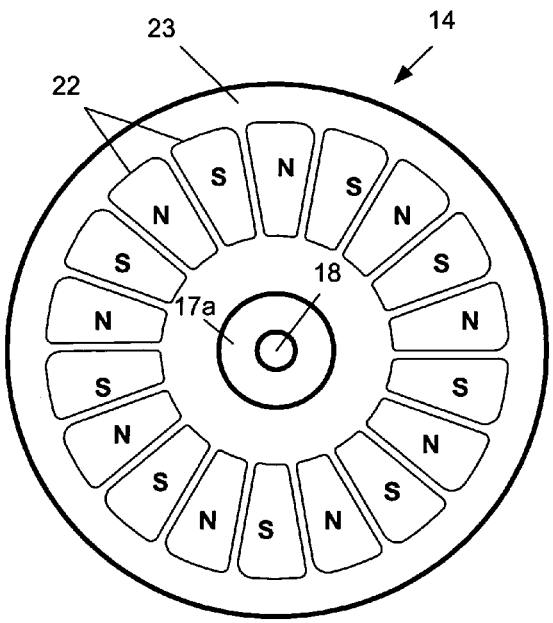
FIG. 2 is a plan view of a rotor for the axial machine of the prior art.

FIG. 1 is a sectional view of a basic configuration of an axial gap PM machine 10 applicable both to the prior art and to the present invention. FIG. 2 is a plan view of a rotor for the axial machine of the prior art that illustrates portions of permanent magnet (PM) material 22 of north (N) and south (S) polarity embedded in a non-magnetic disk 23 to form a rotor 14. This embodiment provides eighteen such PM poles. A hub 17 is provided and this is securely attached the rotor shaft 18 with the aid of collar pieces 17a seen in FIG. 1. The rotor shaft 18 is carried in bearings 19, 20 in a machine housing 21. The rotor 14 is positioned between two stator assemblies 11, 12 which are spaced apart to provide a vertical operating space for the rotor 14. Each stator assembly includes a core 11a, 12a and a winding of multiple turns of wire 11b, 12b. When the rotor 14 is positioned in that space, two axial air gaps 15, 16 are provided, one between each face of the rotor 14 and a respective stator assembly 11, 12. The stator assemblies 11, 12 are ring-shaped, so that both portions on each side of the rotor 14 seen in FIG. 1 are connected, although this connection is not shown in FIG. 1. There are other various known configurations for axial-gap PM motors. For example, a PM rotor having a flux return path on one side of the rotor can be used with one stator assembly. The present invention is applicable to all of these known configurations.

Figure 3:
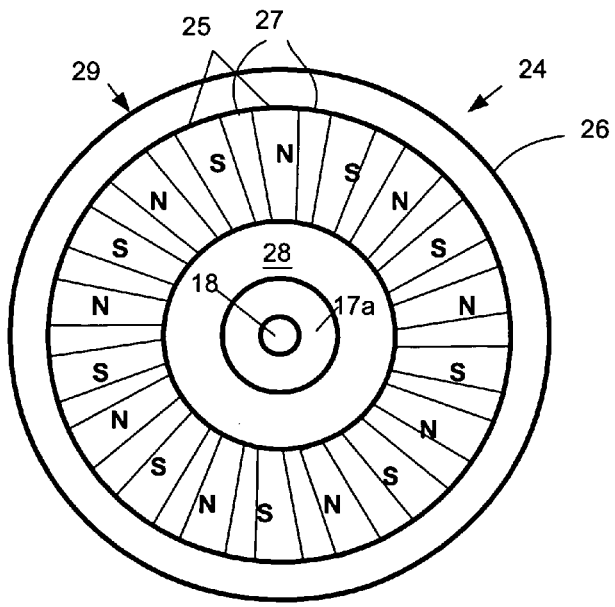
FIG. 3 is a plan view of a rotor for the axial gap machine of the present invention.

FIG. 3 shows an example of a rotor 24 for an axial gap machine of the present invention. Portions of permanent magnet (PM) material 25 of north (N) and south (S) polarity are embedded in a non-magnetic disk 29 for a machine rotor. The portions of PM material 25 are angularly spaced and alternated with reluctance pole elements 27. The other aspects of construction are similar to the general configuration described above in relation to FIG. 1. A hub 17 is provided to attach the rotor shaft to the rotor 24. A disk 28 is disposed around the hub 17 to help hold the pole pieces 25, 27 in place together with an outer ring 26. The hub and disk 28 can be one piece of aluminum of different thicknesses. The rotor shaft 18 is carried in bearings 19, 20 in a machine housing 21. The rotor 24 is positioned between two stator assemblies 12 which provide the vertical operating space for the rotor. When the rotor 24 is positioned in that space, the two axial air gaps 15, 16 are provided, one between each face of the rotor 14 and a respective stator assembly 11, 12. The stator cores 11b, 12b are ring-shaped, so that both portions on each side of the rotor are connected, although this connection is not shown in the sectional view.

Figure 4:
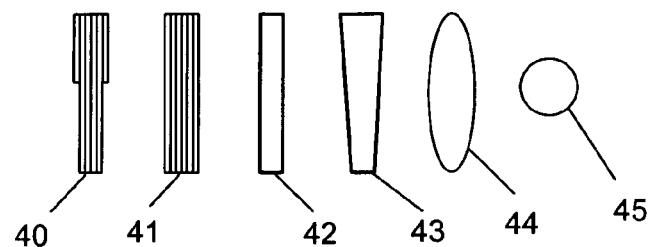
FIG. 4 is a sectional view of several reluctance pole configurations for the rotor according to the present invention.
Figure 7:
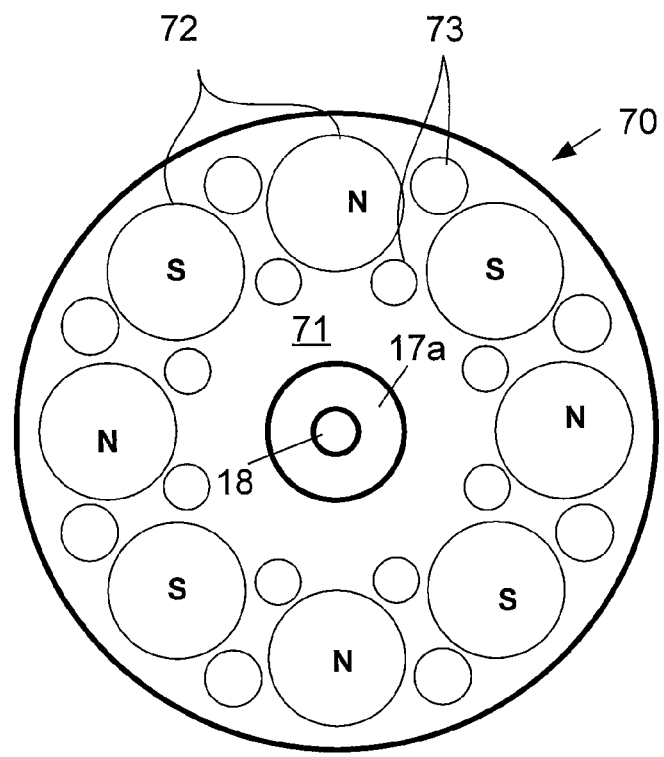
FIG. 7 is a plan view of a second embodiment of a rotor for an axial gap machine of the present invention.

FIG. 4 shows examples of constructions and shapes for the reluctance poles. A first reluctance pole configuration 40 includes laminations and two sections of different width or thickness. A second reluctance pole configuration 41 includes laminations but has a uniform width or thickness. A third configuration 42 is solid with uniform width or thickness. A fourth, trapezoidal configuration 43 is solid with a tapered width or thickness extending radially from wider at an outer end to narrower at an inner end. A fifth configuration 44 is elliptical in shape. A sixth configuration 45 is circular in shape, and a more illustrative example is seen in FIG. 7. In FIG. 7, round PM pole portions 72 and round reluctance pole portions 73 are embedded in a disc 71 of non-magnetic material to form a rotor 70 for mounting on a rotor shaft. The reluctance poles in these examples are made of ferromagnetic material, preferably iron or an iron alloy.

Figure 5:
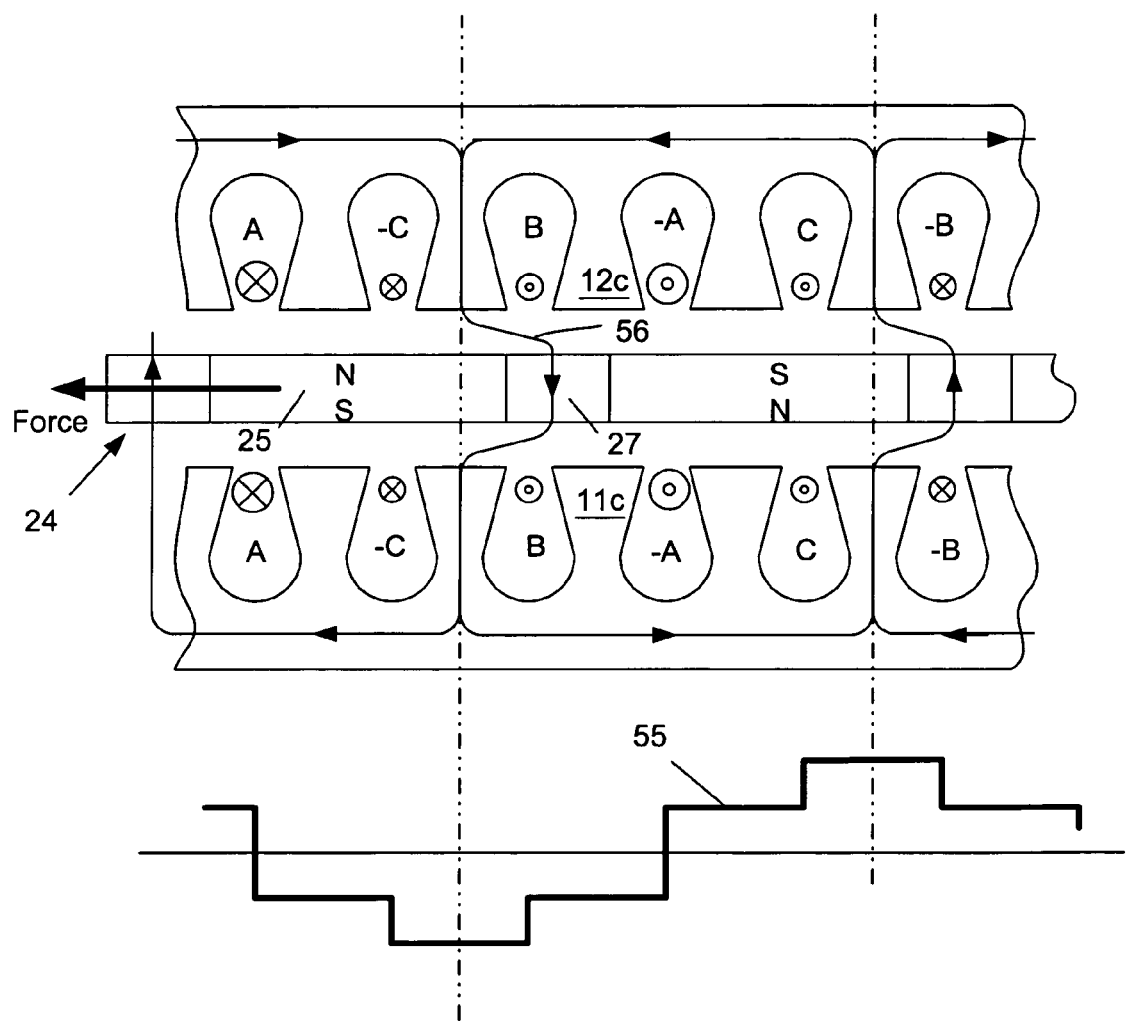
FIG. 5 is a detail sectional view of the embodiment in FIGS. 1 and 3 taken in a plane indicated by line 5-5 in FIG. 1.
Figure 6:
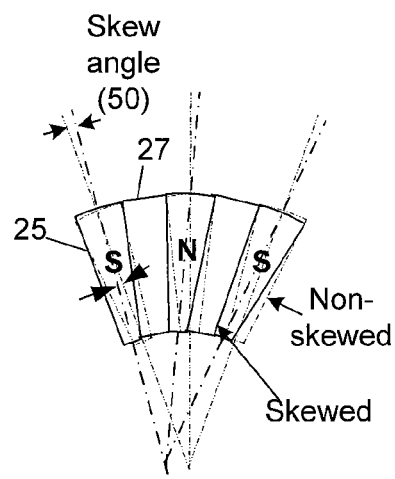
FIG. 6 is a detail view of several rotor PM poles and reluctance poles of the present invention, showing a skew angle.

The present invention can be applied to many axial-gap PM machines. As shown in FIG. 5, instead of a circular magnet shape which generates a sinusoidal back emf wave shape, a wedge shape for the PM portions 25 generates a back emf wave 55 of trapezoidal shape. As shown in FIG. 6 the PM poles 25 and reluctance poles 27 can be skewed at an angle 50 in relation to normal radii from a center of the rotor. Normally this angle 50 is chosen as one stator slot angle (example: for a 54-stator-slot motor the angle is 360/54=6.67 degrees). This angular offset will reduce reluctance torque ripple. An even number of wedges 25 with alternating axial magnetic polarity are alternated with reluctance poles 27 to form an annulus of magnetic material. Fourth, the PM magnets 25, instead of being embedded in nonmagnetic material for support, are held in place by radial interference between an outer ring 26 and an aluminum hub 28 as seen in FIG. 3. A titanium ring 26 (or other non-magnetic high-strength material) may be used with a hub 28 of aluminum to provide and interference fit that is aided by these pieces having a different rate of thermal expansion in response as the operating temperature of the machine is increased up to a steady-state value. An axial-gap PM motor without reluctance poles has been built and tested to deliver 30 kW. Prior to electrical testing it maintained its integrity to 6600 rpm. The reluctance poles can be introduced for this motor and for all of the aforementioned rotors.

As further seen in FIG. 5, conductors A, B and C for three phases of electricity are shown with a dot signifying a direction of current out of the plane of the figure and an "X" signifying a direction of current into the plane of the paper. The instantaneous current in phase A must equal the sum of the currents in phases B and C. The incoming current is signified by the large wires for phase A. The return currents in wires—C and B are each equal to one-half the incoming current. These three phase currents produce a stator MMF wave (magnetomotive force) 55 that is illustrated at the bottom of the figure. The flux produced by this MMF wave 55 seeks the shortest path and creates the twisted flux 56 of stator MMF as shown in upper portion of FIG. 5. This twisted flux 56 produces the reluctance torque. The PM pole elements 25 interacting with the currents in the conductors also create a PM synchronous torque. The resultant torque is normally greater than either the PM synchronous torque or the reluctance torque alone. The above explanation for the PM and reluctance torques can also be applied to a six-step current conduction, with only two phases conducting at a given time, as for brushless DC motors.

The same techniques used to design the 30 kW axial-gap PM motor can be used to design a non-round-pole axial-gap PM reluctance motor. For example, the different thermal coefficients of expansion of the aluminum hub 28 (13.6×E-6/° F.) and a titanium ring 26 (5.3×E-6/° F.) seen in FIG. 3 assures that, for the same dimensions as the 30 kW PM motor ($R_{A1}$=3.5 in. and $R_{Ti}$=5 in.), the gap between the aluminum hub 28 and titanium ring 26 will decrease as temperature rises, to increase the assembly interference on the magnets 25, which is necessary for stable operation as temperature increases. There will be a difference in the thermal coefficient of expansion of the ferromagnetic reluctance poles 27 (7×E-6/° F.) alternated between the PM elements 25, whose radial coefficient is negative, because the radial direction is transverse to the magnetic field (−0.2×E-6/° F.). Each ferromagnetic reluctance pole wedge 27 will push out on the outer ring 26, which will cause the material between to move inward like an inflexible neutral membrane. This, in turn, will further increase the original interference on the PM elements 25 for stable operation as temperature increases.

The non-magnetic rotor hub 28 and outer ring 26 prevents flux from flowing through a body of the rotor 24 and concentrates flux in the reluctance pole pieces 27. The hub 28 and ring 26 also withstand centrifugal stresses in a high-power machine and provide a lower inertia machine than one having a rotor with additional iron for a flux return path.

Figure 8:
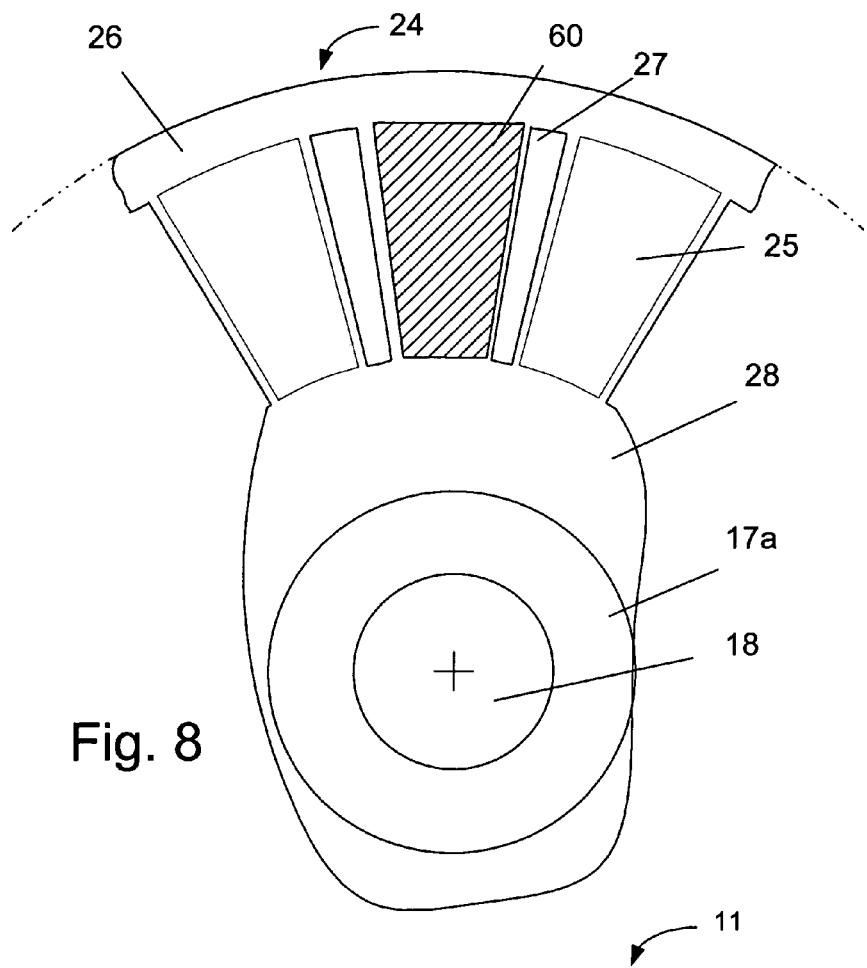
FIG. 8 is a detail plan view of a rotor in an embodiment according to FIGS. 1 and 3 with the addition of PM covers.
Figure 9:
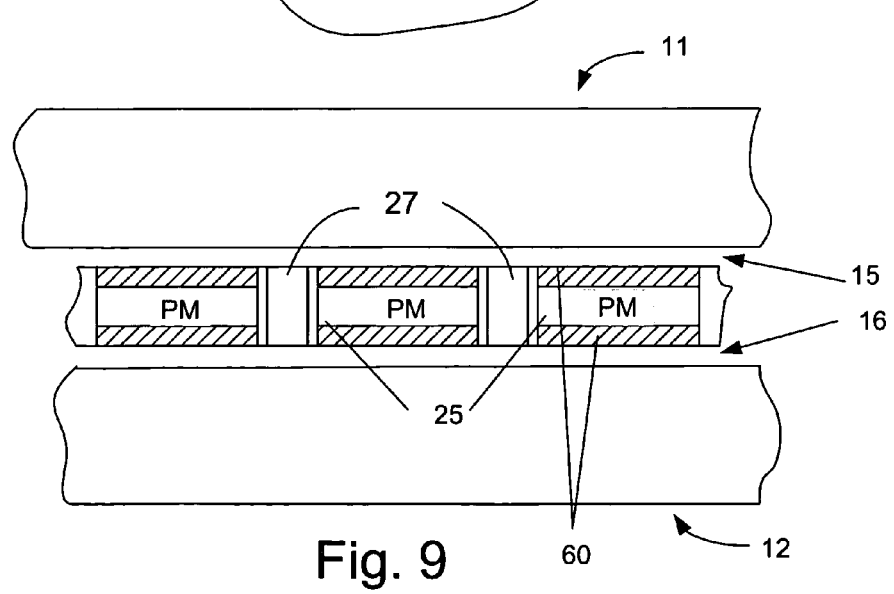
FIG. 9 is an edge view of the rotor of FIG. 8 with an outer ring removed.

FIGS. 8 and 9 show details of the rotor 24 with three PM elements 25, one of which has an outer layer or cover 60 of soft ferromagnetic material, but non-PM material. In FIG. 9, the outer ring 26 has been removed for a better view. Two of the elements 25 are shown in FIG. 8 without this PM cover 60, but in FIG. 9, all three elements 25 have this layer or cover 60 which extends over all surfaces of the PM elements 25, the top portion being removed to expose the PM material in FIG. 9. The PM cover 60 is made from a soft ferromagnetic material which can be radially or circumferentially laminated, molded or formed using other known techniques. Between the elements 25 are positioned reluctance pole elements 27 of iron or an iron alloy. In FIG. 9 a portion of the rotor 24 is shown positioned between the two wound stators 11, 12 to provide two axial air gaps 15, 16.

Figure 10:
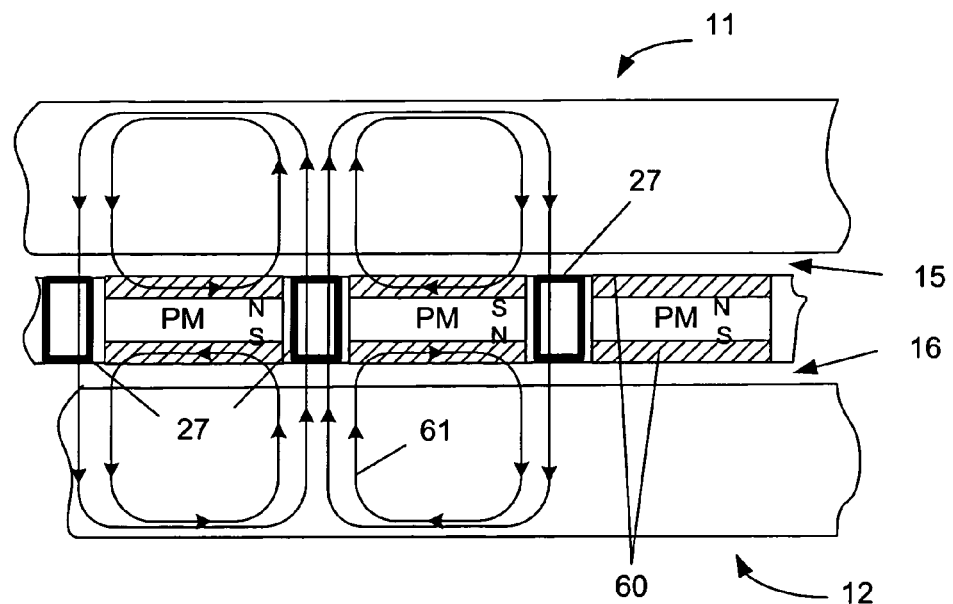
FIG. 10 is an edge view of the rotor of FIG. 8 with an outer ring removed, showing q-axis flux paths in the machine.
Figure 11:
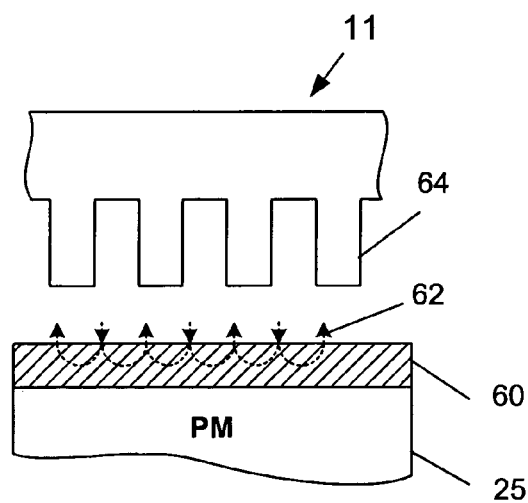
FIG. 11 is an enlarged detail edge view of the rotor of FIG. 8 with an outer ring removed, showing tooth harmonic flux paths.
Figure 12:
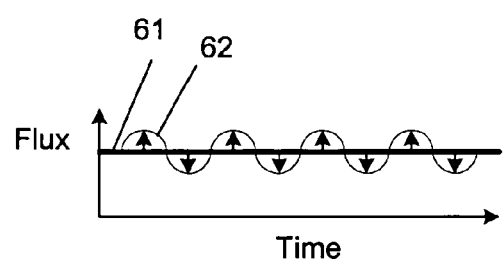
FIG. 12 is graph of flux vs. time in the air gap seen in FIG. 11.

Referring to FIG. 10, the PM covers 60 result in enhancement of conduction of the q-axis (torque-producing) flux 61 through the reluctance poles 27 by allowing flow through the covers 60 to reinforce flow through the reluctance poles 60. Such flux does not flow through the PM elements 25. In addition, as seen in FIGS. 11 and 12, a harmonic flux 62 produced by the teeth 64 of the stators 11, 12, (only one being shown by example) is short-circuited in the PM covers 60, so that only fundamental frequency flux is produced in the air gaps 15, 16.

The machine of the present invention is applicable for the hybrid electric vehicle application, but is not limited to this application.

The invention provides higher power density through the use of reluctance poles in an axial gap machine. The invention also provides multiple configurations for the rotor of an axial gap machine. The constructions described herein are compact. The use of a single PM rotor with two stator assemblies doubles the inductance. The reluctance poles then further increase the phase inductance. This compensates for the normally low inductance characteristic of PM motors. The use of PM elements located near the slot openings in the stator reduces the cogging torque and rotor surface losses.

The invention is applicable to both AC and DC brushless machines. It is also applicable to both motors and generators.

This has been a description of the preferred embodiments of the invention. The present invention is intended to encompass additional embodiments including modifications to the details described above which would nevertheless come within the scope of the following claims.

We claim:

1. A brushless electric machine, comprising:
   at least one stator assembly for receiving ac electrical power to provide a magnetic field;
   a rotor disposed within the magnetic field of the stator assembly and spaced from the stator to define a primary air gap relative to an axis of rotation for the rotor;
   wherein the rotor is disk-shaped and is spaced from the stator assembly along an axis of rotation for the rotor to form a first axial air gap;
   further comprising a second stator assembly disposed on an opposite side of the rotor from the at least one stator assembly and separated from the rotor by a second axial air gap; and
   wherein the disk-shaped rotor further comprises a nonmagnetic hub and a non-magnetic outer ring;
   wherein the rotor is provided with a plurality of permanent magnetic elements for coupling flux that is induced by the magnetic field of the stator assembly; and
   wherein the permanent magnetic elements are spaced apart and wherein reluctance poles of ferromagnetic material are positioned in spaces between the magnetic elements to couple additional flux induced by the magnetic field of the stator assembly, whereby a flux return path through ferromagnetic material is limited in the rotor to the reluctance poles; and
   wherein the permanent magnetic elements each have an outer cover of non-PM ferromagnetic material that covers a core of PM material and faces both the first stator assembly and the second stator assembly, the cover enhancing the torque-producing flux in the reluctance poles through the first stator assembly and the second stator assembly and short-circuiting any harmonic flux received from the first stator assembly and the second stator assembly.

2. The machine of claim 1, wherein the first stator assembly and the second stator assembly have teeth projecting toward the first air gap and second air gap, respectively, and wherein the outer layer of non-PM ferromagnetic material is a laminated material.

3. The machine of claim 2, wherein the reluctance poles are offset from the stator teeth to produce a twisted flux relative to the stator teeth.

4. The machine of claim 1, the permanent magnetic elements are formed of solid material.

5. The machine of claim 1, wherein the permanent magnetic elements are wedge-shaped.

6. The machine of claim 1, wherein the permanent magnetic elements are circular in shape.

7. The machine of claim 1, wherein the permanent magnetic elements are elliptical in shape.

8. The machine of claim 7, wherein the reluctance poles are formed by elements of ferromagnetic material that are circular in shape and embedded in a body of the rotor.

9. The machine of claim 1, wherein the machine is a brushless ac machine.

10. The machine of claim 1, wherein the machine is a dc brushless machine.

11. The machine of claim 1, wherein the machine is a motor.

12. The machine of claim 1, wherein the machine is a generator.

13. A brushless electric machine, comprising:
- at least one stator for receiving ac electrical power to provide a magnetic field;
- a rotor disposed within the magnetic field of the stator and spaced from the stator to define a primary air gap relative to an axis of rotation for the rotor;
- wherein the rotor is disk-shaped and is spaced from the stator along an axis of rotation for the rotor to form a first axial air gap;
- wherein the rotor is provided with a plurality of permanent magnetic elements for coupling flux that is induced by the magnetic field of the stator; and
- wherein the permanent magnetic elements are spaced apart and wherein reluctance poles are positioned in spaces between the magnetic elements to couple additional flux induced by the magnetic field of the stator;
- wherein the disk-shaped rotor is formed with a cylindrical a non-magnetic hub and a non-magnetic outer ring, and wherein the permanent magnetic elements and the reluctance poles are wedge-shaped pieces held between the hub and the outer ring; and
- wherein the stator has teeth projecting toward the air gap and wherein the elements of permanent magnetic (PM) material each have an outer cover of non-PM ferromagnetic material that covers a stator-facing side and an opposite side of a core of PM material, the cover enhancing the torque-producing flux in the reluctance poles on opposite sides of the elements of permanent magnetic (PM) material, by coupling the torque-producing flux through the stator, and the cover short-circuiting tooth-harmonic flux from the teeth of the stator.

14. The machine of claim 13, wherein the hub is aluminum and the outer ring is titanium, the hub and the outer ring having a thermal coefficient of expansion such that the wedge-shaped pieces are held in place with an interference fit at an operating temperature of the machine.

15. The machine of claim 13, wherein the permanent magnetic elements and the reluctance poles are wedge-shaped with an axis of symmetry that is skewed at an acute angle with respect to normal radii from a center of the rotor for torque ripple reduction.

16. The machine of claim 15, wherein the acute angle is approximately seven degrees.

17. The machine of claim 1, wherein all of the permanent magnetic elements have outer covers of non-PM ferromagnetic material.

18. The machine of claim 13, wherein all of the permanent magnetic elements have outer covers of non-PM ferromagnetic material.

* * * * *